(12) United States Patent
Kurachi et al.

(10) Patent No.: US 8,905,469 B2
(45) Date of Patent: Dec. 9, 2014

(54) VEHICLE SEAT

(75) Inventors: Shinji Kurachi, Kariya (JP); Ryou Hattori, Kariya (JP); Toshihiko Maeta, Toyota (JP); Akira Konagai, Toyota (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 226 days.

(21) Appl. No.: 13/131,125

(22) PCT Filed: May 12, 2009

(86) PCT No.: PCT/JP2009/058856
§ 371 (c)(1),
(2), (4) Date: Aug. 10, 2011

(87) PCT Pub. No.: WO2010/131332
PCT Pub. Date: Nov. 18, 2010

(65) Prior Publication Data
US 2012/0043796 A1 Feb. 23, 2012

(51) Int. Cl.
*B60N 2/30* (2006.01)
*B60N 2/015* (2006.01)
*B60N 2/70* (2006.01)

(52) U.S. Cl.
CPC .......... *B60N 2/01583* (2013.01); *B60N 2/3011* (2013.01); *B60N 2/3043* (2013.01); *B60N 2/7094* (2013.01)
USPC ............................ 297/14; 297/331; 297/335

(58) Field of Classification Search
USPC .......................................... 297/14, 331, 335
See application file for complete search history.

(56) References Cited

U.S. PATENT DOCUMENTS

| 4,759,580 | A | * | 7/1988 | Berklich et al. ........... 296/65.03 |
| 4,971,379 | A | * | 11/1990 | Rumpel et al. .................. 296/63 |
| 5,372,398 | A | * | 12/1994 | Aneiros et al. ............. 296/65.03 |
| 5,489,141 | A | * | 2/1996 | Strausbaugh et al. ........ 297/335 |
| 5,700,055 | A | * | 12/1997 | Davidson et al. ......... 297/335 X |
| 5,984,397 | A | | 11/1999 | Dawson et al. |

(Continued)

FOREIGN PATENT DOCUMENTS

| CN | 1576096 A | 9/2005 |
| DE | 69508614 T2 | 6/1996 |

(Continued)

OTHER PUBLICATIONS

Australian Office Action issued for Australian Patent Application No. 2009346108 dated Apr. 16, 2012.

(Continued)

*Primary Examiner* — Rodney B White
(74) *Attorney, Agent, or Firm* — Caesar, Rivise, Bernstein, Cohen & Pokotilow, Ltd.

(57) ABSTRACT

A leg (50) is pivotably supported by a cushion frame (16) such that part of the leg (50) is accommodated in a space (S) surrounded by the cushion frame (16). When the leg (50) is folded, part of the leg (50) is accommodated in the space (S) surrounded by the cushion frame (16). Thus, when the seat cushion (12) is flipped up to a storage position along a side wall (34) of the passenger compartment, part of the leg (50) is accommodated in the space (S) surrounded by the cushion frame (16). This prevents the leg (50) from projecting from the cushion frame (16) by the amount corresponding to the thickness of the accommodated portion.

8 Claims, 6 Drawing Sheets

(56) References Cited

U.S. PATENT DOCUMENTS

| | | | | |
|---|---|---|---|---|
| 6,161,890 A | * | 12/2000 | Pesta et al. | 296/65.01 |
| 6,460,929 B2 | * | 10/2002 | Kamida | 297/14 X |
| 6,843,526 B2 | | 1/2005 | Honda et al. | |
| 2005/0012367 A1 | | 1/2005 | Satani | |

FOREIGN PATENT DOCUMENTS

| | | |
|---|---|---|
| EP | 1040961 A1 | 10/2000 |
| EP | 1075983 A1 | 2/2001 |
| JP | 59-155229 U | 10/1984 |
| JP | 07-187036 A | 7/1995 |
| JP | 08-142725 A | 6/1996 |
| JP | 09193699 A | 7/1997 |
| JP | 10-095260 A | 4/1998 |
| JP | 10-109578 A | 4/1998 |
| JP | 11-147432 A | 6/1999 |
| JP | 2008-126742 A | 6/2008 |

OTHER PUBLICATIONS

International Preliminary Report on Patentability for PCT/JP2009/058856 completed Feb. 3, 2010.

German Office Action dated Aug. 9, 2012 for German Appl. No. 10 2009 004 774.2.

International Search Report for PCT/JP2009/058856 mailed Jul. 14, 2009.

* cited by examiner

Bonmarche
VEHICLE SEAT

FIELD OF THE INVENTION

The present invention relates to a vehicle seat that can be flipped up toward a side wall of a passenger compartment.

BACKGROUND OF THE INVENTION

Conventionally, single-box vehicles such as station wagons and vans include a third vehicle seat row in addition to the front and rear seat rows. A seat in such a third seat row is disclosed in, for example, Patent Documents 1 to 4. The legs for a seat cushion of the vehicle seat are detachably located on the vehicle floor.

When in use, the seat cushion is arranged at a horizontal use position, and a seat back is arranged upright on the seat cushion. When the vehicle seat is stored, the seat back is collapsed onto the seat cushion, and in a state in which the leg is detached from the vehicle floor, the seat cushion and the seat back are flipped up along the side wall of the vehicle floor to be arranged in a storage position.

In such a flip-up vehicle seat, mounting lugs extend from a cushion frame of the seat cushion, and the leg is attached to the mounting lugs via brackets. When mounting such a leg on the cushion frame, the leg is pivotably attached to the brackets in advance, and the brackets are tightened to the mounting lugs of the cushion frame.

However, when the vehicle seat is stored, the seat cushion is flipped up to be arranged along the side wall of the vehicle floor, and the leg is pivoted toward the seat cushion to be folded. In this state, the leg projects toward the interior of the vehicle from the cushion frame by the amount corresponding to the thickness of the leg.

Therefore, in a state in which the seat cushion is flipped up, the width of the luggage compartment of the vehicle undesirably becomes narrow. Also, if the projecting amount of the leg from the cushion frame is great, the appearance is undesirably deteriorated.

Patent Document 1: Japanese Laid-Open Patent Publication No. 8-142725
Patent Document 2: Japanese Laid-Open Patent Publication No. 10-109578
Patent Document 3: Japanese Laid-Open Patent Publication No. 11-147432
Patent Document 4: Japanese Laid-Open Patent Publication No. 2008-126742

SUMMARY OF THE INVENTION

Accordingly, it is an objective of the present invention to provide a vehicle seat that has a reduced projecting amount of a leg from a cushion frame into the space in the passenger compartment, thus reducing the thickness of a seat cushion, increasing the width of the luggage compartment of the vehicle, accordingly, and reducing deterioration of the appearance.

To achieve the foregoing objective, and in accordance with one aspect of the present invention, a vehicle seat including a seat cushion and a leg is provided. The seat cushion is pivotably supported in a passenger compartment. The seat cushion is configured to be selectively flipped up from a use position parallel to a floor surface of the passenger compartment to a storage position along a side wall of the passenger compartment. The leg is pivotably supported by a cushion frame of the seat cushion. The leg is foldable with respect to the cushion frame. When the leg is folded, at least part of the leg is accommodated in a space surrounded by the cushion frame.

With this structure, when the seat cushion is flipped up to the position along the side wall of the passenger compartment, at least part of the leg is accommodated in the space surrounded by the cushion frame. Thus, the folded leg is prevented from projecting from the cushion frame by an amount corresponding to the thickness of the accommodated portion. As a result, the projecting amount of the leg into the space in the passenger compartment from the cushion frame is reduced, thereby reducing the thickness of the part below the seat cushion, and increasing the width of the luggage compartment of the vehicle by the amount corresponding to the reduced thickness. This reduces deterioration of the appearance.

The leg is preferably supported to be pivotable with respect to the seat cushion via a bracket, and the bracket is preferably arranged to be located in the space surrounded by the cushion frame when the leg is folded.

With this structure, the bracket pivotably supporting the leg is arranged to be located in the space surrounded by the cushion frame. Thus, the leg is easily accommodated in the cushion frame.

A pivot center of the leg when folding the leg with respect to the bracket is preferably located in a thickness range of the cushion frame.

With this structure, since the pivot center of the leg when folding the leg with respect to the bracket is located in the thickness range of the cushion frame, at least part of the leg is accommodated in the space surrounded by the cushion frame when folding the leg.

The height of the pivot center of the leg from the floor surface of the passenger compartment when folding the leg with respect to the bracket is preferably set equal to the height of the cushion frame from the floor surface of the passenger compartment.

With this structure, since the height of the pivot center of the leg from the floor surface of the passenger compartment when folding the leg with respect to the bracket is set equal to the height of the cushion frame from the floor surface of the passenger compartment, at least part of the leg is accommodated in the space surrounded by the cushion frame when folding the leg.

The bracket is preferably tightened to the cushion frame with a fastener. The leg preferably includes a recess for permitting access of a fastening tool for tightening the fastener to the cushion frame.

With this structure, since the leg includes a recess for permitting access of a fastening tool for tightening the fastener to the cushion frame, the fastening tool can be arranged in the recess. As a result, a working space for the fastening tool for tightening the bracket to the cushion frame is ensured.

DETAILED DESCRIPTION OF THE PREFERRED EMBODIMENTS

A vehicle seat according to one embodiment of the present invention will now be described with reference to FIGS. 1 to 7.

Figure 1:
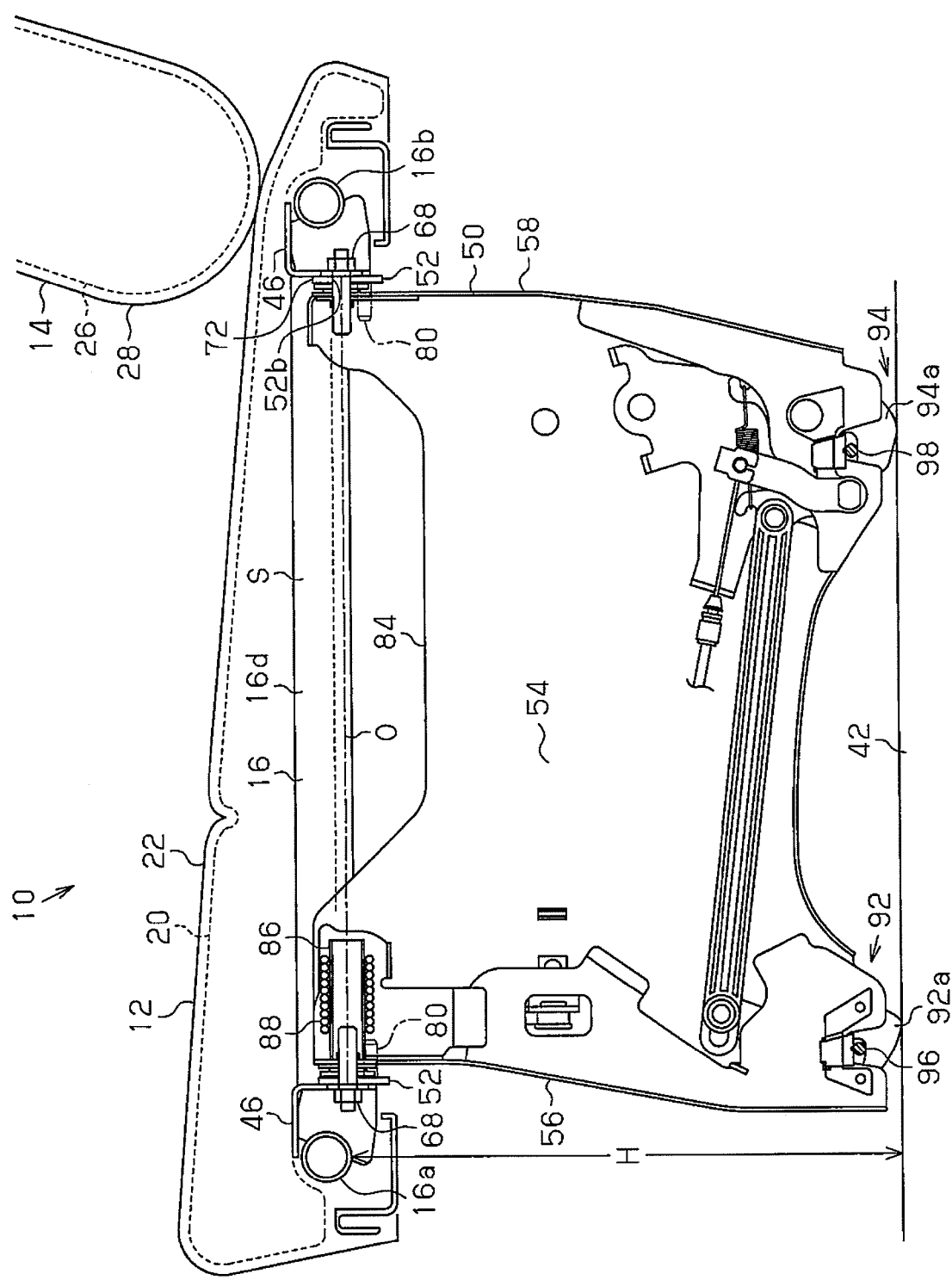
FIG. 1 is a schematic side view illustrating a leg when a seat cushion of a vehicle seat according to one embodiment of the present invention is arranged at a use position.
Figure 2:
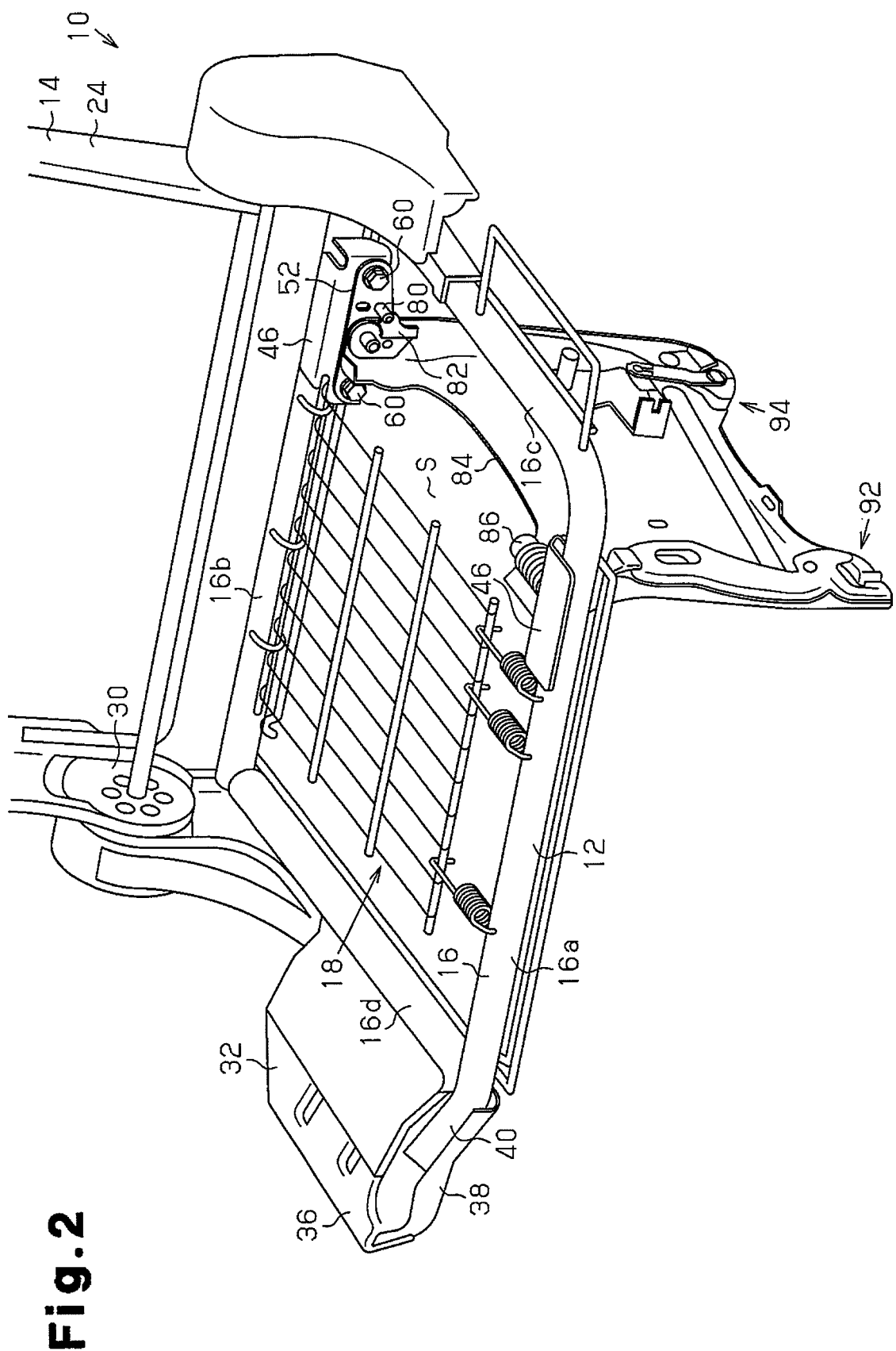
FIG. 2 is a schematic perspective view illustrating the vehicle seat at the use position.

The vehicle seat 10 is arranged in a passenger compartment, and includes a seat cushion 12 and a seat back 14 pivotably coupled to the rear portion of the seat cushion 12 as shown in FIGS. 1 and 2. The seat cushion 12 includes a cushion frame 16, a pad 20 supported by a spring body 18 mounted on the cushion frame 16 in a tensioned state, and a surface material 22 for covering the pad 20. The cushion frame 16 is formed of a pipe material having a circular cross section, and includes a front frame 16a and a rear frame 16b arranged on the front and rear sides of the seat 10, and a left frame 16c and a right frame 16d arranged on the left and right sides of the seat 10. The cushion frame 16 is not limited to be formed of pipe material having a circular cross-section, but may be formed of a pipe material having a rectangular cross-section, and may be formed of a mold material having an L-shaped cross-section.

As shown in FIGS. 1 and 2, the seat back 14 includes a back frame 24, a pad 26 supported by a spring body provided on the back frame 24 in a tensioned state, and a surface material 28 covering the pad 26. A reclining device 30 is provided between the cushion frame 16 and the back frame 24. The reclining device 30 couples the seat back 14 to the seat cushion 12 such that the angle with respect to the seat cushion 12 is adjustable.

Figure 6:
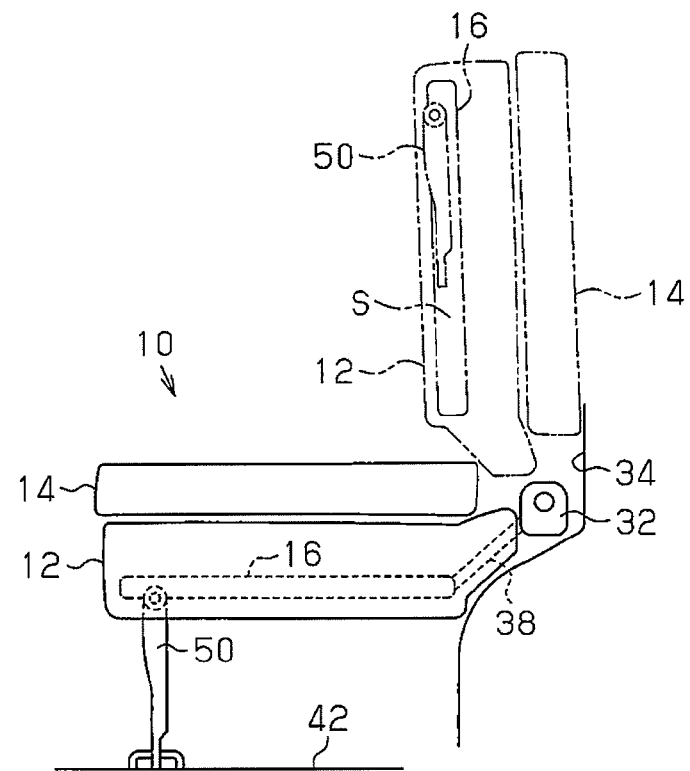
FIG. 6 is an explanatory diagram showing the use position and the storage position of the vehicle seat.

As shown in FIGS. 2 and 6, a hinge mechanism 32 is mounted on a side wall 34 (shown in FIG. 6) of the passenger compartment adjacent to the seat cushion 12. As shown in FIG. 2, the hinge mechanism 32 includes a stationary member 36 secured to the side wall 34, and a movable member 38 pivotably attached to the stationary member 36. The right frame 16d of the cushion frame 16 is coupled to the movable member 38 via an attaching portion 40 extending toward the side wall 34. The seat cushion 12 is pivoted by the hinge mechanism 32 between a use position at which the seat cushion 12 is arranged parallel to a floor surface 42 of the passenger compartment, and a storage position at which the seat cushion is flipped up along the side wall and upright.

A leg 50 is provided on the inner side of the seat cushion 12 as shown in FIGS. 1 and 2.

Figure 3:
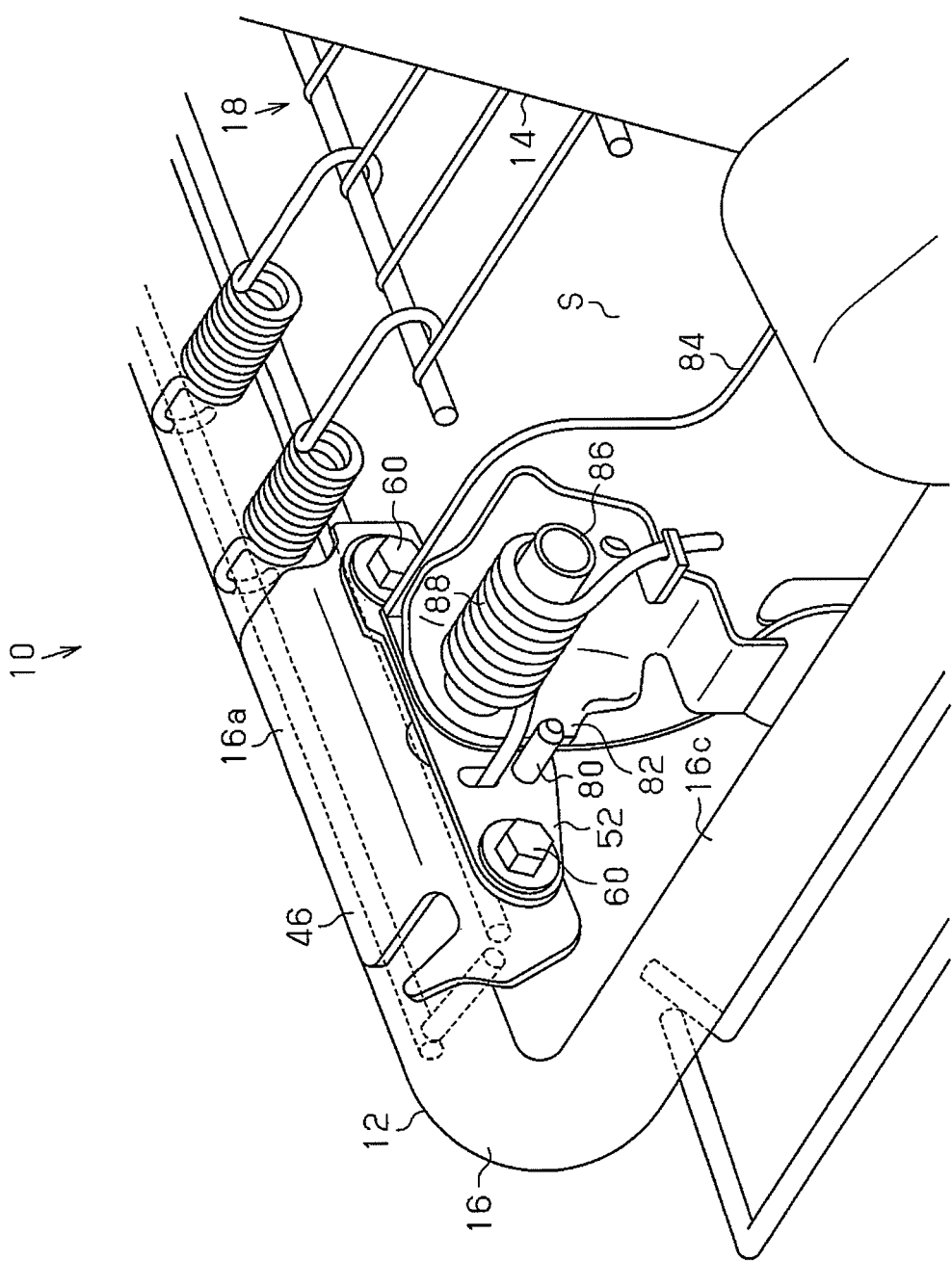
FIG. 3 is a perspective view illustrating the mounting structure of the front portion of the leg.
Figure 4:
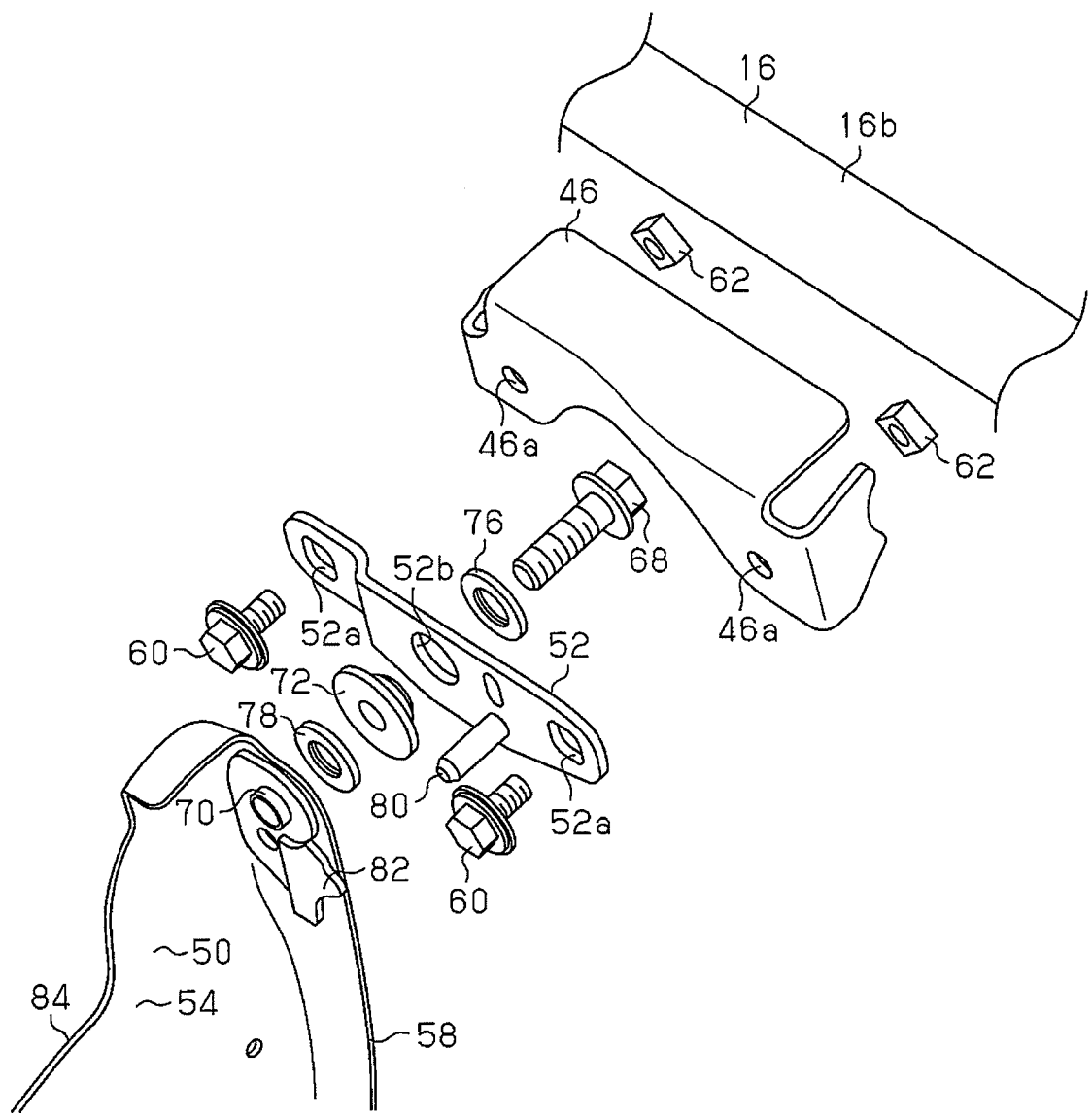
FIG. 4 is an exploded perspective view illustrating the mounting structure of the rear portion of the leg.

As shown in FIGS. 1, 3, and 4, a pair of mounting lugs 46 for mounting the leg 50 is secured to the inner surfaces of the front frame 16a and the rear frame 16b of the cushion frame 16 that face each other by, for example, welding.

The configuration of the mounting lugs 46, and the mounting structures for the front portion and the rear portion of the leg 50 with respect to the mounting lugs 46 are identical. Therefore, for purposes of illustration, the mounting structure for the rear portion of the leg 50 will hereafter be described. In regard to the mounting structure for the front portion, unless otherwise stated, components of the mounting structure for the front portion are given the same reference numerals as the components of the mounting structure for the rear portion, and detailed explanation is omitted.

As shown in FIG. 4, a pair of mounting bores 46a is formed through both left and right ends of the mounting lug 46 provided on the rear frame 16b. The leg 50 includes a plate-like leg main body 54 and end plates 56, 58 formed on the front and rear portions of the leg main body 54 and bent to be substantially perpendicular to the leg main body 54. The leg 50 is formed into a size that can be accommodated in a space S surrounded by the cushion frame 16 shown in FIG. 2 when being folded with respect to the cushion frame 16 from the mounting position of the leg 50 on the cushion frame 16. That is, the vertical height of the leg 50 is set to a length shorter than the distance between the left frame 16c and the right frame 16d. Also, the length of the leg 50 in the fore-and-aft direction is set to a length shorter than the distance between the front frame 16a and the rear frame 16b. The upper end of the end plate 58 on the rear side of the leg 50 is coupled to the mounting lug 46 via a bracket 52.

Figure 5:
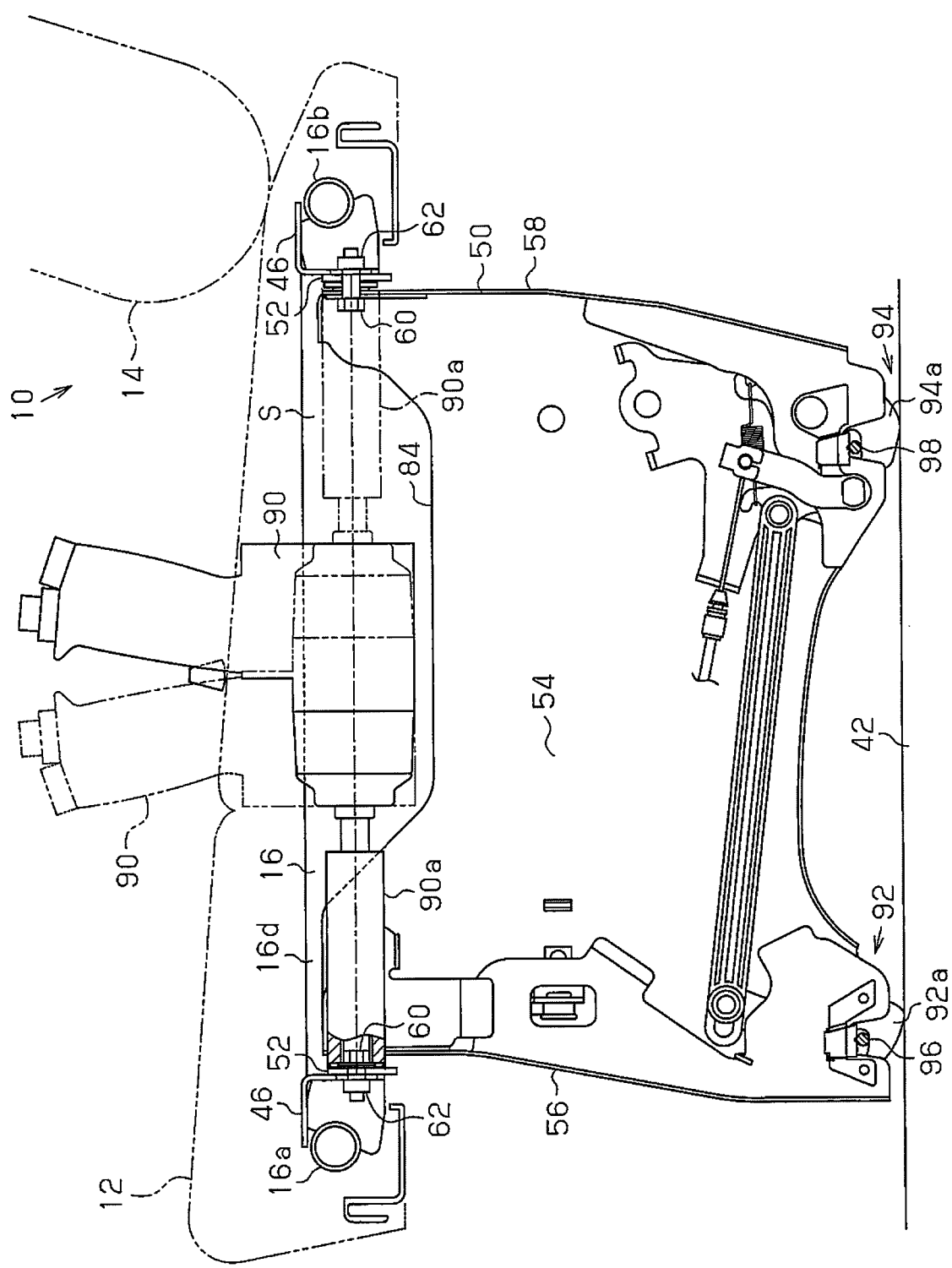
FIG. 5 is an explanatory diagram showing the arrangement state of a fastening tool for tightening the leg to the cushion frame.

As shown in FIGS. 2 and 4, the bracket 52 extends left and right along the rear frame 16b, and a pair of through holes 52a is formed through the left and right portions of the bracket 52. As shown in FIGS. 4 and 5, the bracket 52 is coupled to the mounting lug 46 by tightening a pair of bolts 60, which is inserted in the through holes 52a and the mounting bores 46a of the mounting lug 46, with a pair of nuts 62. The bolts 60 and the nuts 62 correspond to fasteners.

As shown in FIG. 4, a shaft hole 52b is formed through the center portion of the bracket 52. A nut body 70 is secured to the upper end of the end plate 58 of the leg 50. A bolt-like pivot support shaft 68 is inserted in the bracket 52 from the side facing the mounting lug 46, and is screwed to the nut body 70 so that the leg 50 is pivotably supported by the bracket 52. That is, the leg 50 is pivotably supported by the rear frame 16b via the bracket 52.

A bearing 72 is fitted to the shaft hole 52b shown in FIG. 4, and the pivot support shaft 68 is pivotably inserted in the bearing 72. Also, a ring-like spacers 76, 78 are arranged between the head of the pivot support shaft 68 and the bracket 52, and between the bearing 72 and the end plate 58. The pivot support shaft 68 is inserted through the spacers 76, 78.

As described above, the mounting structure for the front portion of the leg 50 with respect to the mounting lug 46 is identical to the mounting structure for the rear portion of the leg 50. Therefore, the mounting structure for the front portion is understood by altering the rear frame 16b explained in the mounting structure for the rear portion to the front frame 16a, and the end plate 58 to the end plate 56.

As described above, the leg 50 is supported by the pair of pivot support shafts 68 via the brackets 52 to be pivotable with respect to the cushion frame 16.

Also, the height H of the cushion frame 16 from the floor surface 42 is set to be equal to the height of a pivot axis O of the pivot support shafts 68 from the floor surface 42 as shown in FIG. 1.

As described above, the height H of the cushion frame 16 and the height of the axis O of the pivot support shafts 68 are set equal to each other. Further, the size of the pivot support shafts 68 is formed such that the pivot support shafts 68 can be accommodated in the space S surrounded by the cushion frame 16. Thus, when the leg 50 is pivoted about the pivot axis O by 90 degrees from a state perpendicular to the cushion frame 16 to the storage position at which the leg 50 is in a folded state, part of the leg 50 is accommodated in the space surrounded by the cushion frame 16 in the thickness direction of the leg 50. The thickness of the leg 50 corresponds to the width of the end plates 56, 58.

As shown in FIGS. 3 and 4, a stopper pin 80 is provided on each bracket 52 between the shaft hole 52b and the through hole 52a on the outer end and projects toward the corresponding one of the end plates 56, 58. An engaging piece 82 is secured to each of the end plates 56, 58 of the leg 50. In a state in which the leg 50 is arranged perpendicular to the cushion frame 16, the engaging pieces 82 of the leg 50 are engaged with the stopper pins 80 to prevent the leg 50 from moving in a direction opposite to the folding direction from the perpendicular state.

A spring support tube 86 is secured to the end plate 56 of the front portion of the leg 50 to be coaxial with the nut body 70 as shown in FIG. 3. A torsion coil spring 88 is wound about the spring support tube 86. As shown in FIG. 3, one end of the torsion coil spring 88 latches onto the bracket 52, and the other end latches onto the engaging piece 82 secured to the leg 50. The torsion coil spring 88 constantly urges the leg 50 toward a direction in which the leg 50 abuts against the stopper pin 80, that is, in a direction in which the leg 50 is arranged perpendicular to the cushion frame 16.

As shown in FIGS. 1, 2, and 5, a recess 84 that opens upward is formed on the upper end of the leg main body 54 of the leg 50. When tightening the bolts 60 to the nuts 62 for coupling each bracket 52 to the associated mounting lug 46, the recess 84 permits entry of a fastening tool 90 such as an electric torque wrench, and provides a working space that permits an operator to tighten the bolts 60 to the nuts 62 using the fastening tool 90.

A pair of lock devices 92, 94 is provided on the front and rear portions of the lower end of the leg 50. In the perpendicular state, the leg 50 is locked by the engagement of strikers 96, 98 with notches 92a, 94a of the lock devices 92, 94. The strikers 96, 98 are arranged on the floor surface 42 along the fore-and-aft direction of the vehicle with an interval between each other. The lock devices 92, 94 can be unlocked by releasing the strikers 96, 98 from the notches 92a, 94a using a non-illustrated operational lever provided on the vehicle seat 10.

When shifting the vehicle seat 10 configured as described above from the use position to the storage position, first, a user tilts the seat back 14 toward the seat cushion 12 and folds the seat back 14 onto the seat cushion 12 as shown in FIG. 6. Then, the user releases the lock of the leg 50 by the lock devices 92, 94 using the non-illustrated operational lever, and lifts the vehicle seat 10 about the hinge mechanism 32. As a result, the seat cushion 12 moves from the use position shown by the solid line toward the storage position shown by the line formed by a long dash alternating with two short dashes as shown in FIG. 6.

Also, in a state in which the vehicle seat 10 is arranged at the storage position, the user manually pivots the leg 50 toward the cushion frame 16 such that the leg 50 is shifted from the state perpendicular relative to the cushion frame 16 to the folded state. Thus, the leg 50 is accommodated in the space S in the cushion frame 16 of the seat cushion 12. FIG. 6 shows a state in which substantially the entire leg 50 is accommodated in the cushion frame 16 by the line formed by a long dash alternating with two short dashes. When the leg 50 is pivoted to the folded state, the leg 50 abuts against the bottom surface of the seat cushion 12, and further pivoting is prevented.

When shifting the seat cushion 12 shown by the line formed by a long dash alternating with two short dashes in FIG. 6 from the storage position to the use position, the seat cushion 12 is pivoted downward about the hinge mechanism 32.

In the vehicle seat 10 configured as described above, the case for mounting the leg 50 on the cushion frame 16 will now be described with reference to FIG. 5.

The pair of brackets 52 is previously mounted on the front portion and the rear portion of the leg 50 via the pivot support shafts 68 shown in FIG. 4. The spring body 18, the pad 20, and the surface material 22 have not been mounted on the cushion frame 16 in FIG. 5.

When mounting the front portion of the leg 50 on the front frame 16a as shown in FIG. 5 in this state, in a state in which the bracket 52 is abutted against the mounting lug 46, an operator inserts the bolt 60 in one of the through holes 52a and the corresponding mounting bore 46a from the side of the bracket 52 facing the leg 50. Then, the operator holds the nut 62 on the back side of the mounting lug 46 to face the bolt 60. Subsequently, the operator inserts the fastening tool 90 such as the electric torque wrench in the cushion frame 16 as shown by the solid line in FIG. 5. In this state, since the recess 84 is formed at the upper section of the leg 50, the working space for the fastening tool 90 is ensured. After fitting the bolt 60 to a torque wrench 90a on the distal end of the fastening tool 90, the operator fastens the bolt 60 to the nut 62 by activating the fastening tool 90. As for the remaining through hole 52a of the bracket 52 at the front portion of the leg 50, the bolt 60 is tightened to the nut 62 using the fastening tool 90 in the same manner.

Also, when mounting the rear portion of the leg 50 to the rear frame 16b, the bracket 52 on the rear portion is tightened to the rear frame 16b by tightening the bolts 60 to the nuts 62 using the fastening tool 90 in the same manner. In FIG. 5, the fastening tool 90 for mounting the rear portion of the leg 50 to the frame forming member 16a is shown by the line formed by a long dash alternating with two short dashes. As shown in FIG. 5, when mounting the rear portion of the leg 50, since the recess 84 is provided on the upper section of the leg 50, the working space for the fastening tool 90 is ensured.

The present embodiment has the following advantages.

(1) In the vehicle seat 10 of the present embodiment, the leg 50 is pivotably supported by the cushion frame 16 such that part of the leg 50 is accommodated in the space S surrounded by the cushion frame 16. As the leg 50 is folded, part of the leg 50 is accommodated in the space S of the cushion frame 16. Thus, when the seat cushion 12 is flipped up to be arranged along the side wall 34 of the passenger compartment, the leg 50 is also accommodated in the space S surrounded by the cushion frame 16. Therefore, the projecting amount of the folded leg 50 from the cushion frame 16 is reduced by the amount corresponding to the thickness of the accommodated part of the leg 50.

Figure 7:
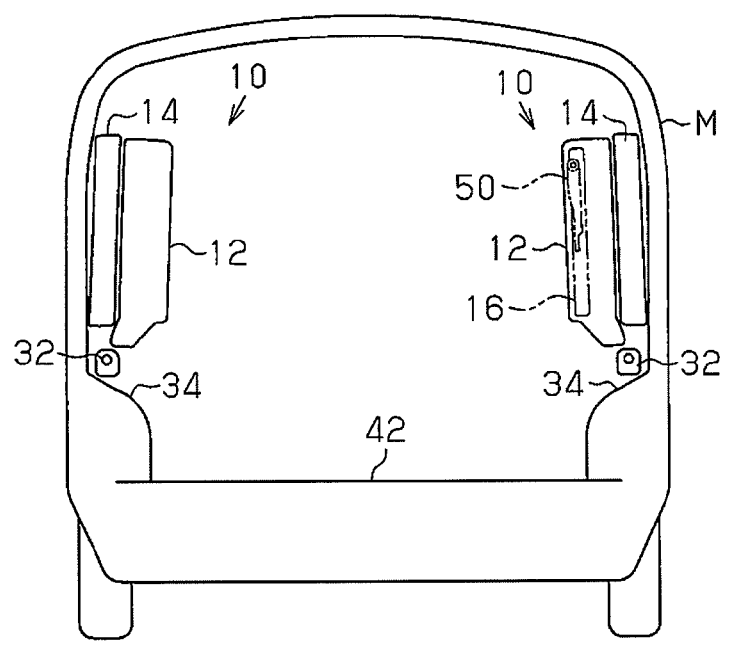
FIG. 7 is an explanatory diagram showing the state of a luggage compartment.

As a result, the projecting amount of the leg 50 into the space in the passenger compartment from the cushion frame 16 arranged at the storage position is reduced, thus reducing the thickness of the seat cushion 12. The width of the luggage compartment of the vehicle is accordingly increased. FIG. 7 shows a state in which the pair of vehicle seats 10 is arranged at the storage position such that the vehicle seats 10 are arranged along the left and right side walls 34 of a vehicle M. As shown in FIG. 7, if the projecting amount of the leg 50 into the space in the passenger compartment from the cushion frame 16 of each of the pair of vehicle seats 10 arranged at the storage position is reduced, the width of the luggage compartment is increased.

Also, if the folded leg 50 is arranged within the outer shape of the seat cushion 12 at the storage position of the vehicle seat 10 as shown in FIGS. 6 and 7, a pleasing appearance is maintained.

Also, in a case in which a cover for covering the outer portion of the periphery of the cushion frame 16 is provided in the thickness direction of the seat cushion 12, the length of the cover in the thickness direction of the seat cushion 12 is also reduced if at least part of the leg 50 is accommodated in the cushion frame 16.

(2) In the vehicle seat 10 of the present embodiment, the leg 50 is supported to be pivotable with respect to the seat cushion 12 via the brackets 52. When the leg 50 is folded, the brackets 52 are arranged to be located in the space S surrounded by the cushion frame 16. Thus, the leg 50 is easily accommodated in the cushion frame 16.

(3) In the vehicle seat 10 of the present embodiment, the pivot center of the leg 50 when the leg 50 is folded with respect to the brackets 52 is arranged within the thickness range of the cushion frame 16. As a result, part of the leg 50 is accommodated in the space S surrounded by the cushion frame 16 when folding the leg 50.

(4) In the vehicle seat 10 of the present embodiment, the height of the pivot center O of the leg 50 from the floor surface 42 when folding the leg 50 with respect to the brackets 52 is set equal to the height H of the cushion frame 16 from the floor surface 42. As a result, the pivoting part of the leg 50 overlaps with the thickness portion of the cushion frame 16, and part of the leg 50 including the overlapped portion is accommodated in the space S surrounded by the cushion frame 16 when the leg 50 is folded.

(5) In the vehicle seat 10 of the present embodiment, the brackets 52 are tightened to the cushion frame 16 by the fasteners, which are the bolts 60 and the nuts 62 in this embodiment. Also, the leg 50 has the recess 84 for permitting access of the fastening tool 90 with which the bolts 60 and the nuts 62 are tightened to the cushion frame 16. As a result, the fastening tool 90 can be arranged in the recess 84, and the working space for the fastening tool 90 is ensured when tightening the brackets 52 to the cushion frame 16.

Conventionally, the mounting lugs for mounting the brackets extend downward from the cushion frame. The brackets are tightened to the mounting lugs in a state in which the fastening tool is arranged outside of the cushion frame so as not to contact the cushion frame. As described above, conventionally, the mounting lugs are arranged below the cushion frame, and the space below the cushion frame was used as the working space for arranging the fastening tool.

In contrast, in the present embodiment, since the recess 84 is formed at the upper section of the leg 50, the space S in the cushion frame can be used as the working space for arranging the fastening tool. As a result, unlike the conventional vehicle seat, it is unnecessary to extend the mounting lugs for mounting the brackets downward from the cushion frame. Thus, the projecting amount of the leg 50 in the space in the passenger compartment from the cushion frame 16 is reduced.

The present embodiment may be modified as follows.

In the above described embodiment, the height of the cushion frame 16 from the floor surface 42 is set equal to the height of the pivot axis O of the pivot support shafts 68 from the floor surface 42 as shown in FIG. 1. However, the heights do not need to be the same as long as the pivot axis O of the pivot support shafts 68 is located within the thickness range of the front frame 16a and the rear frame 16b. With this configuration, when the leg 50 is pivoted by 90 degrees from the upright state in the folding direction to be folded, the entire leg 50 or at least part of the leg 50 is accommodated in the cushion frame 16. As a result, the projecting amount of the leg 50 in the space of the passenger compartment from the cushion frame is eliminated or reduced, and the thickness of the seat cushion 12 is reduced. Accordingly, the width of the luggage compartment of the vehicle is increased.

In the above described embodiment, the leg 50 is pivotably supported by the cushion frame 16 such that part of the leg 50 is accommodated in the space S surrounded by the cushion frame 16. Instead, the leg 50 may be pivotably supported by the cushion frame 16 such that the entire leg 50 is accommodated in the space S surrounded by the cushion frame 16.

In the above described embodiment, the leg 50 is mounted on the cushion frame 16 via the mounting lugs 46. However, the mounting lugs 46 may be omitted, and the leg 50 may be mounted on the front frame 16a and the rear frame 16b.

In the above described embodiment, the leg 50 includes the plate-like leg main body 54 and the end plates 56, 58, which are bent to be substantially perpendicular to the leg main body 54 on the front and rear edge of the leg main body 54. Instead of this configuration, the leg 50 may be formed by a pipe material.

While the invention has been described in detail and with reference to specific embodiments thereof, it will be apparent to one skilled in the art that various changes and modifications can be made therein without departing from the spirit and scope thereof.

The invention claimed is:

1. A vehicle seat comprising:
   a seat cushion pivotably supported in a passenger compartment, the seat cushion being configured to be selectively flipped up from a use position parallel to a floor surface of the passenger compartment to a storage position along a side wall of the passenger compartment; and
   a leg supported to be pivotable with respect to a cushion frame of the seat cushion on an inner side of said seat cushion, the leg being foldable with respect to the cushion frame, wherein
   the seat cushion includes a cushion frame having a front frame and a rear frame arranged on front and rear sides of the seat, respectively,
   the leg includes a leg main body and end plates formed on the front and rear portions of the leg main body and bent to be substantially perpendicular to the leg main body,
   the leg is pivotably supported by the front and rear frames of the cushion frame via the end plates and brackets,
   the brackets are attached to the front and rear frames of the cushion frame via fasteners,
   a recess is provided in the upper end of the main body of the leg, wherein each of the brackets extends along the cushion frame, and wherein the brackets, the fasteners and the cushion frame are aligned at the same height when the seat is in a use position, and wherein the recess permits access by a fastening tool from above for tightening the fasteners to the cushion frame when the seat is in a use position, and
   when the leg is folded, at least part of the leg is accommodated in a space located between the front frame and the rear frame so that the at least part of the leg is located between an upper surface of the seat cushion and a plane defined by bottom surfaces of the front frame and the rear frame, and wherein said folded leg remains at said inner side.

2. The vehicle seat according to claim 1, wherein the brackets are arranged to be located in the space surrounded by the cushion frame.

3. The vehicle seat according to claim 1, wherein a pivot center of the leg when folding the leg with respect to the brackets is located in a thickness range of the cushion frame.

4. The vehicle seat according to claim 3, wherein the height of the pivot center of the leg from the floor surface of the passenger compartment when folding the leg with respect to the brackets is set equal to the height of the cushion frame from the floor surface of the passenger compartment.

5. The vehicle seat according to claim 1, wherein a pivot center is located in a thickness range of the front frame and the rear frame.

6. The vehicle seat according to claim 1, wherein when the seat is in a use position, the height of the cushion frame from the floor surface of the passenger compartment is set to be substantially equal to the height of a pivot center of the leg from the floor surface of the passenger compartment.

7. The vehicle seat according to claim 1, wherein the fasteners includes a bolt and a nut.

8. The vehicle seat according to claim 1, wherein two through holes, in which bolts are inserted, are formed through each of the brackets and a shaft hole, in which a pivot shaft is inserted, is formed through each of the brackets at a position between the through holes.

\* \* \* \* \*

UNITED STATES PATENT AND TRADEMARK OFFICE
CERTIFICATE OF CORRECTION

PATENT NO. : 8,905,469 B2  
APPLICATION NO. : 13/131125  
DATED : December 9, 2014  
INVENTOR(S) : Kurachi et al.

Page 1 of 1

It is certified that error appears in the above-identified patent and that said Letters Patent is hereby corrected as shown below:

Title page, Item (73) assignee: after "Aichi-Ken (JP)", insert on the next line the following:

-- Toyota Jidosha Kabushiki Kaisha
Aichi-Ken (JP) --

Signed and Sealed this
Twenty-second Day of December, 2015

Michelle K. Lee
*Director of the United States Patent and Trademark Office*